United States Patent [19]

Gallagher et al.

[11] Patent Number: 4,735,533
[45] Date of Patent: Apr. 5, 1988

[54] VALVE LOCKING ASSEMBLY

[75] Inventors: Michael T. Gallagher, Mayfield Heights; Ray D. Linderman, Streetsboro; Peter C. Williams, Cleveland Heights, all of Ohio

[73] Assignee: Whitey Co., Highland Hts., Ohio

[21] Appl. No.: 922,527

[22] Filed: Oct. 24, 1986

Related U.S. Application Data

[63] Continuation-in-part of Ser. No. 844,812, Mar. 27, 1986.

[51] Int. Cl.$^4$ .............................................. F16B 39/10
[52] U.S. Cl. ..................................... 411/119; 411/120
[58] Field of Search .......................... 411/117, 90–100, 411/119–124, 129–131

[56] References Cited

U.S. PATENT DOCUMENTS

| | | | |
|---|---|---|---|
| 167,967 | 9/1875 | Wright | 411/121 |
| 168,690 | 10/1875 | Watson | 411/95 X |
| 227,812 | 5/1880 | Miller . | |
| 250,763 | 12/1881 | Sprecher | 411/94 X |
| 315,895 | 4/1885 | Brady . | |
| 385,889 | 7/1888 | Van Wart . | |
| 402,023 | 4/1889 | Leiby | 411/99 X |
| 443,309 | 12/1890 | Back | 411/95 X |
| 513,393 | 1/1894 | Hays . | |
| 525,431 | 9/1894 | Sparks | 411/120 |
| 542,879 | 7/1895 | Evinof . | |
| 555,396 | 2/1896 | Packer | 411/94 |
| 589,966 | 9/1897 | Harris | 411/120 |
| 605,861 | 6/1898 | Doran | 411/93 |
| 632,501 | 9/1899 | Ling | 411/94 |
| 757,526 | 4/1904 | Varley . | |
| 785,919 | 3/1905 | Robertson . | |
| 829,485 | 8/1906 | O'Meara . | |
| 922,642 | 5/1909 | Twyman . | |
| 999,606 | 8/1911 | Stillwell | 411/120 |
| 1,054,291 | 2/1913 | Hancock | 411/120 |
| 1,070,946 | 8/1913 | Davis | 411/120 |
| 1,088,515 | 2/1914 | Bazin | 411/120 |
| 1,190,318 | 7/1916 | Nelson | 411/120 |
| 1,208,980 | 12/1916 | Kiefer | 411/94 |
| 1,332,268 | 3/1920 | Nainka | 411/120 |
| 1,344,684 | 6/1920 | Eisenhart . | |
| 1,599,775 | 9/1926 | Lamb et al. | 285/114 |
| 1,741,077 | 12/1929 | Rusack | 411/91 |
| 1,787,709 | 12/1937 | Barker . | |
| 2,002,403 | 5/1935 | Kosma . | |
| 2,025,004 | 12/1935 | Shearer | 40/607 |
| 2,612,911 | 10/1952 | Usry | 139/158 |
| 3,254,399 | 5/1966 | Zahuranec . | |
| 3,389,735 | 6/1968 | Katz | 411/120 |
| 3,493,026 | 2/1970 | Donofrio | 411/120 |
| 3,761,053 | 9/1973 | Bedo et al. | 251/88 |
| 4,114,851 | 9/1978 | Shivak et al. | 251/88 |
| 4,577,891 | 3/1986 | Fielding | 411/93 X |

FOREIGN PATENT DOCUMENTS

| | | | |
|---|---|---|---|
| 753086 | 2/1967 | Canada . | |
| 694307 | 7/1940 | Fed. Rep. of Germany . | |
| 1248372 | 10/1960 | France | 411/98 |
| 1081784 | 8/1967 | United Kingdom . | |

*Primary Examiner*—Lloyd A. Gall
*Attorney, Agent, or Firm*—Fay, Sharpe, Beall, Fagan, Minnich & McKee

[57] ABSTRACT

A locking assembly for locking a multi-sided nut-like member in a desired communicating relationship with a valve body. The locking assembly includes a lock plate having a planar body portion with a locking opening defined by a plurality of sides oriented relative to each other in a closed, star-like configuration. The locking opening is adapted to be closely received over and communicate with the sides of an associated nut-like member. The body portion also includes an arcuate mounting slot spaced from the locking opening and which is adapted to receive a lock plate mounting fastener therethrough. A continuous side wall or skirt portion depends from the periphery of the body portion and serves to space the body portion from the surface of an associated valve body. Preferably, a lock plate adapter is also provided. The adapter includes a body member having a through opening which is received over a section of the associated nut-like member, and a securing member cooperable with the lock plate mounting slot. The lock plate adapter also includes a mounting portion adapted for disposition in contacting relation with the associated valve body.

25 Claims, 3 Drawing Sheets

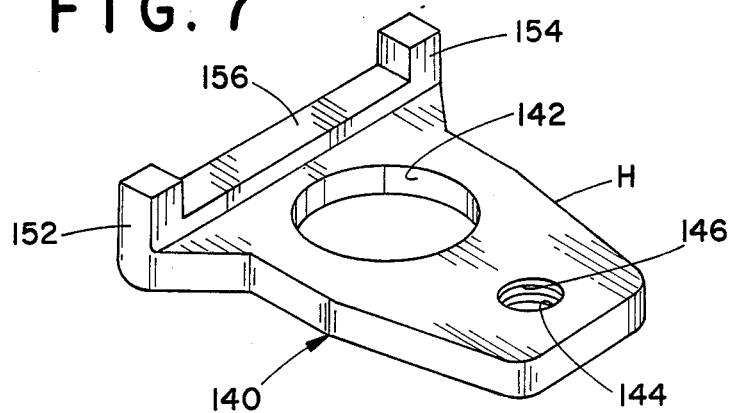
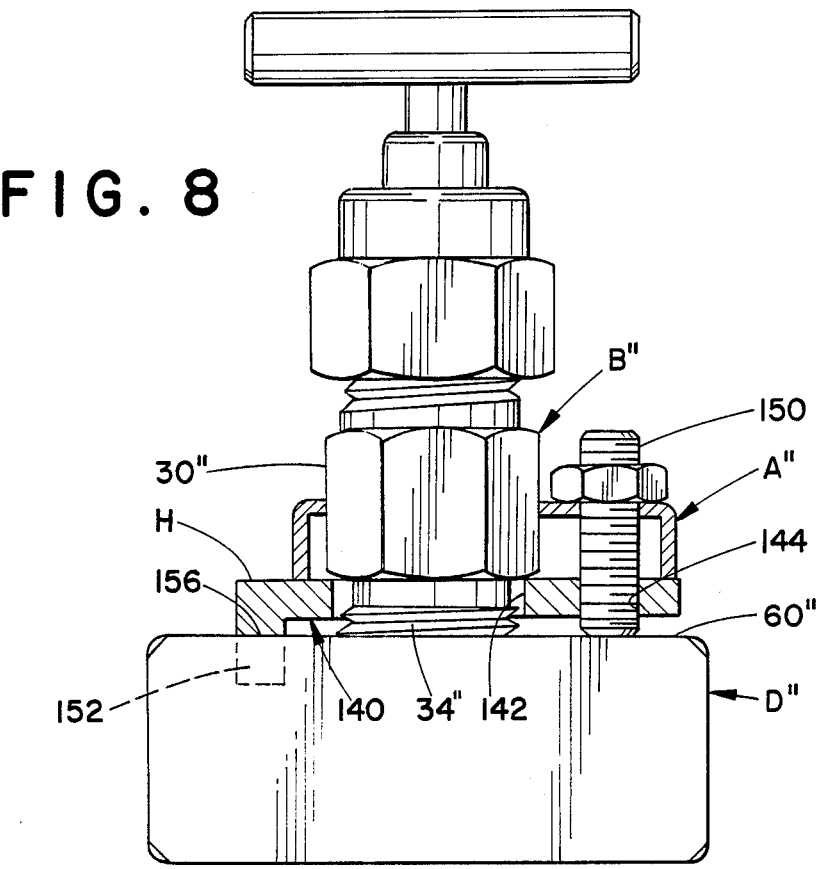

VALVE LOCKING ASSEMBLY

This application is a continuation-in-part of application Ser. No. 844,812 filed on Mar. 27, 1986.

BACKGROUND OF THE INVENTION

This invention generally pertains to locking assemblies. More specifically, the present invention relates to a locking assembly for locking a multi-sided member in a particular rotated orientation relative to a rigid body. The invention is particularly applicable to locking a bonnet or packing nut in a predetermined, threadedly installed relation to a valve body and will be described with reference thereto. However, it will be appreciated by those skilled in the art that the invention has broader application and may be adapted to use in many other environments as well.

With regard to valves, a compressive force on the sealing medium interposed between the valve body and the valve bonnet or packing nut is required to prevent leakage of system fluid through the mating threads between the valve body and the bonnet. The bonnet must be adjusted to a final position in the valve body so that the innermost end thereof exerts a desired compressive force against the sealing medium. Once a final adjustment position has been obtained, it is desirable to retain the bonnet in that position with some assurance that it will not be moved or rotated therefrom. Any relieving of the compressive force on the sealing medium would promote fluid leakage out of the valve past the above noted mating threads. Even more serious however, is the fact that excessive rotation of the bonnet could weaken the threaded interconnection with the valve body to such an extent that the bonnet could be forcibly ejected from association with the body by the pressure of the system fluid.

Accordingly, locking brackets have been utilized to retain the desired threaded interconnection between the bonnet and valve body. These prior locking brackets have, however, been generally configured so that when the bonnet was rotated to a final adjusted position, the locking bracket would overhang the valve body and thereby render it possible for clothing, tools, equipment and the like to catch thereon, and to cause injury or damage to the valve. Moreover, due to the specifics of the prior locking bracket designs, they were not adjustable to the extent required for providing a full range of locking positions for the associated bonnet. Also, such locking bracket designs necessitated the use of a fastener which penetrated the valve body for attachment purposes. This, in turn, required that the valve body be equipped with a threaded opening at some predetermined location thereon. Difficulties could arise in those situations where insufficient room was available on the body to accommodate the appropriate threaded opening.

Another known locking bracket is dimensioned for eliminating the problems associated with overhang. This known bracket is not, however, as easily and inexpensively manufactured as is desirable. Moreover, in this type of locking bracket, the fastener which secures the bracket to the valve body still requires cooperation with an aperture in the body. Again, the provision of such an aperture may be difficult in some valve bodies. Typical of these situations are where smaller or special valve bodies are involved which simply do not have a size or conformation to accommodate receipt of a separate mechanical fastener.

Accordingly, it has been considered desirable to develop a new and improved arrangement for locking a multi-sided member in a desired mounted relation relative to a rigid body. The subject invention overcomes the foregoing difficulties and others while providing better and more advantageous overall results.

BRIEF SUMMARY OF THE INVENTION

In accordance with the present invention, a new and improved locking assembly is provided for locking a multi-sided member in a desired communicating orientation with a host body.

More particularly in accordance with the invention, the locking assembly is comprised of a locking member having a planar body portion which includes a locking opening therethrough defined by a plurality of discrete sides having a generally star-like arrangement. The locking opening is adapted to be closely received over and communicate with the sides of an associated multi-sided member. The body portion also includes an arcuate mounting slot spaced from the locking opening and adapted to receive a stem portion on an associated fastener. A continuous planar side wall or skirt portion depends from the periphery of the body portion. The side wall or skirt serves to space the body portion from the surface of an associated rigid body with which it is associated.

In accordance with another aspect of invention, the assembly further includes a locking member adapter comprised of a body member having a through opening adapted for receipt in surrounding relation with a section of the associated multi-sided member and a securing means cooperable with the lock plate mounting slot. The locking member adapter also includes an integral mounting portion adapted to contact the surface of the associated rigid body.

According to a further aspect of the invention, the locking member body portion has a pair of side edges which taper relative to each other from a maximum width adjacent the locking opening to a minimum width adjacent the mounting slot.

In accordance with a still further aspect of the invention, the locking member comprises a metal stamping.

According to still another aspect of the invention, the star-like conformation of the locking member locking opening has at least twice the number of sides as an associated multi-sided member.

In accordance with yet another aspect of the invention, the securing means of the locking member adapter includes a threaded shaft secured at one end to the adapter body member so as to extend transversely therefrom. The threaded shaft is adapted to extend through the locking member mounting slot and threadedly receive a retaining member to fixedly secure the locking member to the adapter. The mounting portion of the locking member adapter preferably includes a pair of wing-like surfaces extending transversely of the adapter body member from opposing side edges thereof. There wing-like surfaces are configured so as to extend over opposing sides of an associated rigid body.

In accordance with yet still another aspect of the invention, the securing means of the locking member includes a threaded aperture extending through the adapter body member in spaced relation to the adapter opening. A threaded fastener is receivable through the aperture so that one end thereof engages a surface of an associated rigid body, and a retaining member receivable from the other end of the fastener secures the locking member to the locking member adapter. The adapter mounting portion preferably includes a foot portion depending therefrom adapted to contact an associated rigid body.

The principal advantage of the present invention is the provision of a new and improved locking assembly for locking a multi-sided member in a desired rotated relation relative to a rigid body.

Another advantage of the invention is the provision of such locking assembly which readily accommodates selective rotated adjustment between the multi-sided member and rigid body.

Still another advantage of the invention is found in locking assembly arrangements which do not require separate attachment apertures in a rigid body with which they are associated.

Yet another advantage of the invention is the provision of a locking assembly which may be constructed from a variety of different materials using a variety of different manufacturing techniques.

A further advantage of the invention is its adaptability to use in a wide range of locking applications.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein:

FIG. 7 is a perspective view of a locking member adapter according to a third preferred embodiment of the present invention; and, FIG. 8 is an end elevational view of a locking assembly installed on a valve bonnet and a valve body, and showing a lock plate adapter formed in accordance with a third preferred embodiment of the invention.

DETAILED DESCRIPTION OF THE PREFERRED EMBODIMENTS

Figure 1:
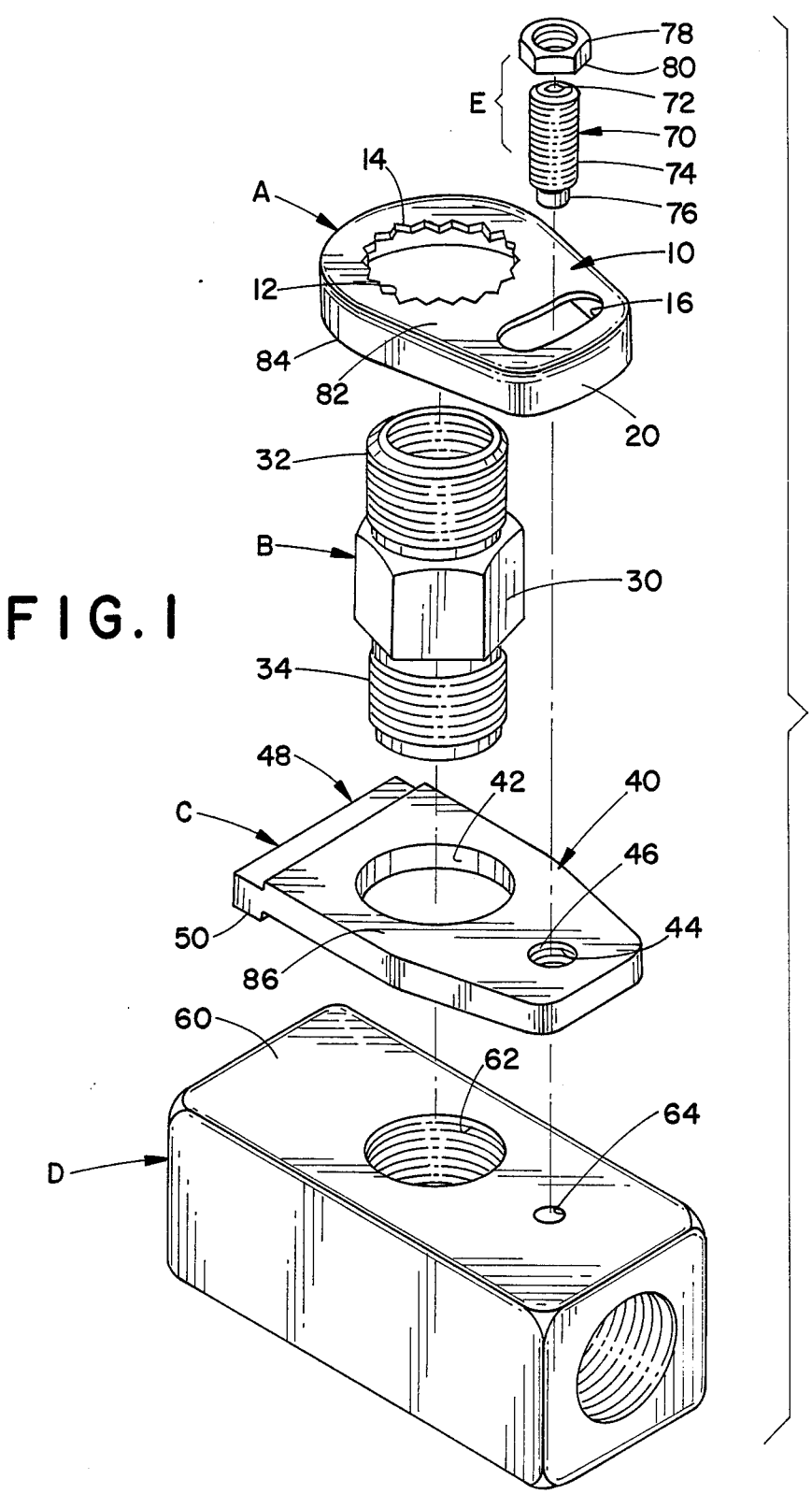
FIG. 1 is an exploded perspective view of a locking assembly adapted for use in association with a valve bonnet and an associated valve body according to a first preferred embodiment of the present invention.

Referring now to the drawings wherein the showings are for purposes of illustrating preferred embodiments of the invention only and not for purposes of limiting same, FIG. 1 shows a first preferred embodiment of the subject new locking assembly. While the locking assembly is primarily designed for and will hereinafter be described in connection with a valve bonnet threadedly received by a valve body, it will be appreciated that the overall inventive concept involved could be adapted to use in other environments as well.

More particularly, the locking assembly includes a locking member in the form of a lock plate A which can be used to secure a valve bonnet B, with or without the assistance of an adapter member C, to a valve body D by means of a fastener means E. Bonnet B includes a nut portion which is operatively engaged by the lock plate in a manner to be described in detail. The lock plate A includes a body portion 10 having a transverse locking opening 12 therethrough defined by a plurality of discrete angled sides 14. Preferably, the plurality of sides 14 are disposed relative to each other as for defining a closed, star-like conformation. In order to retainingly engage a conventional hexagonal-shaped nut portion of the bonnet B, twenty-four sides 14 may be provided and arranged to define a twelve pointed star-like arrangement. Of course, it is evident that conformations having a greater or lesser number of sides can also be used, depending upon the type of nut which is to be retained and the number of sides 14 which are desired per side of the nut.

Figure 3:
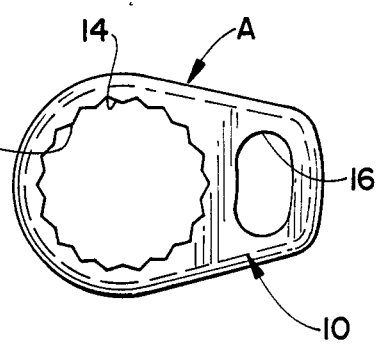
FIG. 3 is a plan view of the locking plate shown FIG. 1.

With reference now also to FIG. 3, the lock plate A includes an arcuate mounting slot 16 therethrough which is spaced from the locking opening 12. The mounting slot 16 is adapted to receive a stem portion of the fastener means E. The radius of curvature of the mounting slot 16 is taken from the center of the locking opening 12 so that the lock plate A may be accurately swung through a limited arc until one end or the other of the slot engages the fastener means stem as different sides 14 of the star-shaped locking opening engage the sides of the nut portion of the bonnet. The lock plate A further includes a planar side wall or skirt portion 20 which depends from the periphery of the body portion 10 and extends therearound. Preferably, the lock plate is stamped from a metal such as steel to provide for a relatively inexpensive manufacture.

Figure 2:
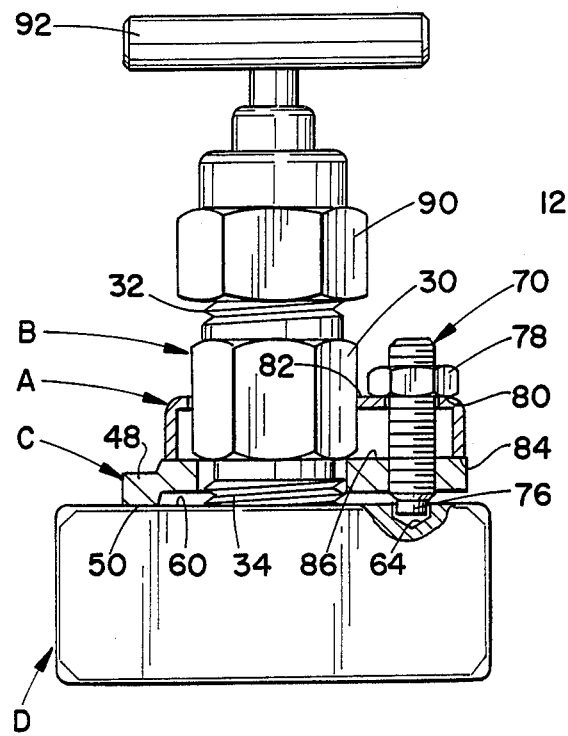
FIG. 2 is a side elevational view in partial cross section of the locking assembly of FIG. 1 in an assembled condition.

Referring to all of FIGS. 1–3, bonnet B is conventional, is threaded into the valve body D, and includes a centrally located multi-sided nut area 30. This area is generally hexagonal in cross section in the manner illustrated, although the invention is usable with other cross-sectional conformations with equal success. A first threaded end 32 of the bonnet extends outwardly beyond the lock plate A and a second threaded end 34 is threadedly received by the valve body. Threaded ends 32, 34 are of a somewhat smaller diameter than the nut area 30.

The lock plate adapter C includes a substantially planar body 40 having an opening 42 extending therethrough. The opening 42 is of a suitable size so that the bonnet threaded portion 34 is easily inserted therethrough. A securing means in the form of a fastener opening 44 extends through the lock plate 40 in spaced relation to the bonnet opening 42 and is cooperable with the lock plate mounting slot 16. This adapter is shown as having threads 46 which receive a threaded fastener means E. The adapter also includes a foot portion 48 depending from the body 40 and adapted to contact the associated valve body D in a manner such that a leading surface 50 of the adapter foot contacts an outer, top surface 60 of the valve body.

As shown, the valve body D also is considered to be conventional, and includes a threaded aperture 62 extending inwardly from outer surface 60 for receiving the second threaded end 34 of the valve bonnet B. A reduced diameter, non-threaded aperture 64 is provided in surface 60 for purposes described below.

Preferably, the fastener means E comprises a set screw 70 having a hex opening 72 at one end to facilitate adjustment and a threaded stem or shank portion 74 terminating in a reduced diameter portion 76 at the other end. The stem or shank portion will pass through slot 16 in lock plate A and be threadedly received by opening 44 in adapter C. A nut 78 is threadedly mounted on the set screw 70 and has a bottom surface 80 for contacting a top surface 82 of the lock plate A. Such contact allows the lock plate A to be forcibly drawn toward the lock plate adapter C until bottom surface 84 of skirt 20 engages top surface 86 of the adapter.

In use, and with particular reference to FIG. 2, when the lock plate A and the lock plate adapter C are cooperatively disposed in locking relation to the associated valve bonnet B and valve D, the set screw 70 extends through the lock plate and lock plate adapter so that the lower end or reduced diameter end portion 76 of the set screw penetrates aperture 64 in the outer face 60 of the valve body. Such relationship prevents undesired bonnet rotation due to the close fitting relationship between the star-like conformation of lock plate opening 12 and the sides of nut-like area 30 on the bonnet. The thickness dimension of adapter C and the width of skirt 20 on the lock plate are such that opening 12 engages nut area 30 at generally the axial mid-portion thereof. It is important to note that the subject locking assembly is effective in any rotated position of the valve bonnet relative to the valve body. The star-like nature of opening 12, wherein the number of points is greater that the number of sides on nut-like area 30, coupled with arcuate slot 16 provides more than adequate adjustment capabilities to assure a desired locked relationship between the bonnet and body. Moreover, when nut 78 is tightly drawn against lock plate A, the desired rotated orientation between the bonnet and valve body will be maintained.

Preferably, the lock plate body member 10 has side edges which converge at an included angle of approximately 30° from the area of opening 12 toward the area of slot 16. The arcuate length of the slot 16 is such as to allow approximately 30° of rotation of the locking plate as the plate is moved from a first position in which the threaded stem 74 of the fastening means E engages one end of the slot to a second position in which it engages the other end of the slot. The tapered appearance of the lock plate A prevents any overhang of the plate relative to the valve body D in any adjusted position thereof, thereby rendering it unlikely that clothing, tools, equipment or the like would catch on the lock plate to cause damage or injury. The lock plate adapter C is similarly tapered to a suitable extent (FIG. 1).

As shown in FIG. 2, a bonnet nut 90 is received on threaded end 32 of bonnet B as is conventional. A handle 92 is shown at a position above nut 90 and is operatively secured to a stem as is also conventional. These showings demonstrate that the subject new locking assembly will not in any way interfere with normal operation of a valve with which it is associated.

If there is sufficient room on the top or outer surface 60 of valve body D for accepting an additional threaded aperture, the lock plate A can be fastened directly to the valve body by a suitable, conventional fastener such as a hex head screw or the like (not illustrated). Such arrangement obviates the need for use of lock plate adapter C. However, sufficient area must be available on surface 60 to allow for the drilling and tapping of an aperture of suitable diameter. In such a case, the side wall or skirt 20 of the lock plate will serve to space the body portion 10 from outer surface 60 of the valve body D so that sides 14 which define opening 12 will still engage nut area 30 of bonnet B.

Figure 5:
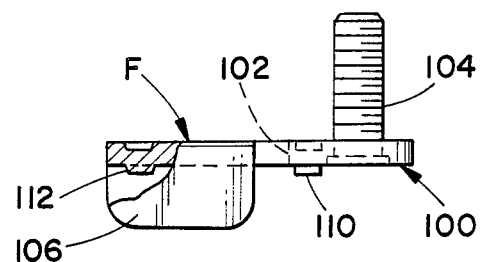
FIG. 5 is a side elevational view in partial cross section showing the lock plate adapter used in FIG. 4.
Figure 4:
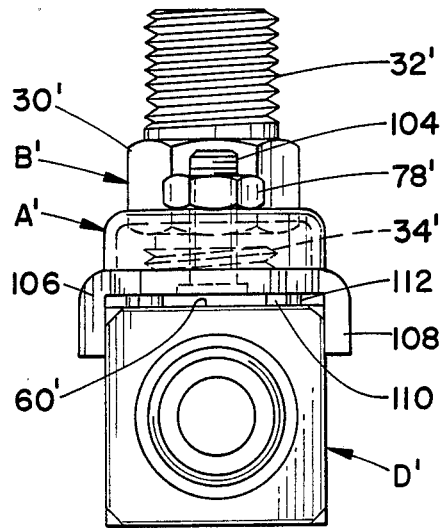
FIG. 4 is an end elevational view of a locking assembly installed on a valve bonnet and a valve body, and showing a lock plate adapter formed in accordance with a second preferred embodiment of the invention.

With reference now to FIGS. 4 and 5, a second preferred embodiment of a locking member adapter F is there shown. For ease of illustration and appreciation of this alternative, like components are identified by like numerals with a primed (') suffix, and new components are identified by new numerals.

In this embodiment, the adapter F includes a body 100 which has an opening 102 (FIG. 5) which is dimensioned to permit passage of bonnet end 34' therethrough. A fastener stem 104 is integral with the body 100 and extends generally normal to the plane thereof. The fastener stem is suitably threaded so that an associated nut 78' can be threadedly received thereon. The adapter also includes a pair of wing-like surfaces or portions 106, 108 which depend from opposed side edges of the body portion 100 in the opposite direction from the fastener stem. The adapter F is of a substantially "saddle" shape and is dimensioned closely to straddle outer surface 60' of a valve body D'.

As with the structural arrangement of FIGS. 1 and 2, a lock plate A' substantially identical to plate A of FIG. 3 and having a star-shaped opening therein is received over a multi-sided nut-like area 30' of the bonnet B'. Also, an arcuate slot in the lock plate is received over the upwardly extending threaded stem 104 on the adapter and the nut 78', in turn, is received on the stem to lockingly retain the lock plate A' in a locking position on adapter F. The wing-like portions 106, 108 serve as mounting means for the adapter F and the lock plate A' to prevent the rotation of the adapter and the plate relative to the valve body D'. As with the adapter C of FIGS. 1-2, the side edges of locking member adapter F are suitably tapered from the area of opening 102 toward the area of the stem so as to prevent any damage or injury due to portions of the adapter extending outwardly of the valve body side edges.

As shown in FIG. 5, the underside of the lock plate adapter F includes a pair of spaced apart, outwardly extending first dimples or embossed areas 110 and a pair of spaced apart second dimples 112 which provide areas of positive registration against the top surface 60' of the valve body D'. Only one each of dimples 110, 112 can be seen in FIG. 5. The pair of second dimples 112 are spaced apart further than the pair of first dimples 110 to provide sufficient room for the central opening 102.

Figure 6:
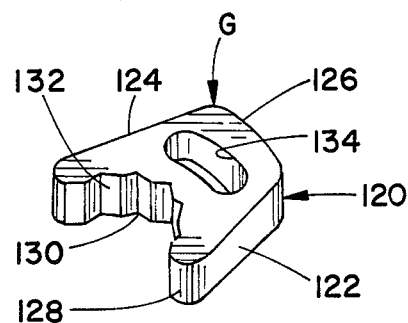
FIG. 6 is a perspective view of a locking member taking the form of a lock tab in accordance with another preferred embodiment of the invention.

With reference now to FIG. 6, another preferred embodiment of a locking member is there illustrated taking the form of a lock tab G. The tab G has a body 120 including a pair of tapered side walls 122, 124 and a pair of end walls 126, 128. A locking opening or aperture 130 extends into the body portion from the second end wall 128. The locking opening is defined by a plurality of discrete sides 132 which are disposed relative to each other to form at least a section of a star-shaped opening. Preferably, the locking tab G has a generally trapezodial shape and the locking opening 130 is generally semicircular.

As shown, the locking opening 130 has twelve sides 132 so as to closely receive and engage either two or three sides of a hexagonal member such as the nut-like area 30 of bonnet B in FIGS. 1 and 2. Similar to the lock plate A previously described, the lock tab G is provided with a star-like conformation for opening 130 which has at least twice the number of points as the potential number of sides on an associated nut-like area which is to be engaged. Thus, depending upon the rotated orientation of the bonnet relative to the valve body, only certain ones of the sides 132 will simultaneously engage the bonnet.

An arcuate mounting slot 134 is also provided in the body portion 120 in spaced relation to the locking opening 130. Preferably, the included angle of taper between opposed sides 122, 124 of the locking tab G is approximately 30°, and the arcuate length of the lot 134 is such to allow approximately 30° of rotation of the locking tab as it is moved from a first position wherein a mechanical fastener engages one end of the slot to a second position where the fastener engages the other end of the slot. Mounting slot 134 has a radius of curvature taken from the center of the locking opening 130.

The locking tab G has a maximum width adjacent the locking opening 130 so that the tab is no wider than a valve body to which it is secured. In addition, the tapering of side walls 122, 124 from opening 130 is such that the tab G will not extend over the edge of an associated valve body when the tab is pivoted relative to the fastener received through slot 134. Mounting of the locking tab G to a valve body may be effected by means previously described, i.e., a hex head screw or a set screw E as in the FIGS. 1–3 embodiment or a lock plate adapter F as in the FIGS. 4 and 5 embodiment, in cooperation with mounting slot 134. The locking tab G can be formed or manufactured by many different convenient means or techniques, although a powdered metallurgy process is deemed preferable.

The arrangement of lock tab G takes up less room or space than the lock plate A, and thus offers more clearance for tubes, equipment and other parts located in close proximity to the associated valve body. Also, the lock tab G can be secured in its locking position relative to the bonnet after the bonnet nut and handle have been installed. Lock plate A, on the other hand requires installation prior to mounting of nut 90 and handle 92 (FIG. 1). However, the tab G is somewhat more expensive to manufacture, and is more easily lost because of its smaller size.

With reference now to FIGS. 7 and 8, a third preferred embodiment of a locking member adapter H is there shown. For ease of illustration and appreciation of this alternative, like components are identified by like numerals with a double primed suffix (″) and new components are identified by new numerals.

In this embodiment, the adapter H includes a body 140 which has an opening 142 that is dimensioned to permit passage of a bonnet threaded area 34″(FIG. 8) therethrough. A securing means, in the form of a fastener opening 144 extends through the adapter body 140 in spaced relation to the bonnet opening 142. The fastener opening may be cooperable with a lock plate mounting slot such as in the embodiment of FIGS. 1–3. Threads 146 are preferably provided in the fastener opening 144 in order to receive a suitable threaded fastener means 150. The adapter also includes a pair of leg-like portions 152, 154 which depend from opposed side edge extensions of the body portion 140 in transverse relation thereto. The adapter legs are dimensioned to closely straddle an outer surface 60″ of a valve body D″. Since the legs extend over side faces of the valve body D″, the locking member adapter is securely disposed on the valve body to prevent movement of the adapter in relation thereto. Such movement, of course, is also additionally resisted by the fastener 150 which extends through the threaded opening 144 of the adapter and bears against the top surface 60″ of valve body D″. Thus a three pronged securing system is provided for the adapter H, and rotation thereof around a vertical axis passing through the valve body D″ is prevented.

A rib 156 extends between the leg 152, 154 so as to enable the major portion of the adapter body 140 to be spaced from the valve body upper surface 60″. As with the adapter C illustrated in FIG. 2, only a leading surface of the rib 156 contacts the valve body upper surface 60″.

In use, and with particular reference now to FIG. 8, when a lock plate A″ and the lock plate adapter H are cooperatively disposed in locking relation to an associated valve bonnet B″ and the valve body D″, the fastener 150 extends through the lock plate and the lock plate adapter to hold the lock plate in place. However, in this embodiment the threaded fastener 150 need not include a lower end portion which extends into a valve body aperture (such as the portion 76 of fastener 70 extending into aperture 64 as illustrated in FIG. 2). Instead, as mentioned, the lower end portion of the fastener 150 bears against the valve body upper surface 60″. Such relationship prevents undesired bonnet rotation due to the close fitting relationship between the lock plate opening and the sides of the nut-like area 30″ on the bonnet. The thickness dimension of the adapter H and the width of a skirt on the lock plate are such that the nut area 30″ is engaged by the lock plate A″ at generally the axial mid-portion.

The lock plate adapter H can have a tapered appearance if desired to prevent any overhang of the adapter relative to the valve body D″ except at the adapter legs. However, an adapter body having a different, and non-tapered, appearance can also be advantageous under certain circumstances.

The present invention provides a locking assembly for locking a multi-sided member in a particular desired communicating orientation with a rigid body. The locking assembly is comprised of a locking member having a body portion which includes a locking opening therethrough defined by a plurality of discrete sides having a generally star-shaped arrangement relative to each other. When installed, the locking member prevents undesired rotational movement of the multi-sided member, generally a bonnet or a packing nut, relative to the associated host body. Preferably, a lock member adapter is also provided to obviate the necessity of having to accommodate a separate mechanical fastener in the host body, generally a valve body. This is advantageous in a situation where a smaller or special valve body simply does not have the size or conformation to accommodate an extra or separate mechanical fastener.

The invention has been described with reference to preferred embodiments. Obviously, modifications and alternations will occur to others upon the reading and understanding of this specification. It is intended to include all such modifications and alternations insofar as they come within the scope of the appended claims or the equivalents thereof.

Having thus described the invention, it is now claimed:

1. A locking assembly for locking a nut-like member to a rigid body, comprising:
   a locking member having a body portion including a locking opening therein comprised of a plurality of discrete sides disposed relative to each other so as to define at least a section of a generally star-shaped conformation adapted to lockingly engage an associated nut-like member, and an arcuate mounting slot extending through said body portion in spaced relation to said locking opening and, a physically separate locking member adapter defined by a body having a transverse opening therethrough adapted to surround a section of an associated nut-like member, securing means for securing said locking member to said locking member adapter, and mounting means for mounting said locking member adapter to an associated rigid body in a non-rotatable manner therewith and wherein said mounting means includes a pair of spaced extensions which project from opposing sides of said adapter body, said transverse opening being located between said securing means and said mounting means.

2. The assembly of claim 1 wherein said locking member body portion has a generally trapezodial periphery and wherein said locking opening forms a generally semicircular opening into said body portion from an end wall thereof.

3. The assembly of claim 2 wherein said securing means includes a threaded shank extending transversely from said adapter body through said body portion mounting slot and a nut which is threadable on an outer end of said shank to secure said locking member to said adapter, and said mounting means spaced extensions comprise a pair of wings extending normally from said adapter body from opposing side edges thereof in a direction away from said threaded shank, said wings being laterally spaced apart from each other so that they are adapted to closely extend over opposed sides of the associated rigid body.

4. The assembly of claim 1 wherein said locking member body portion is planar and further includes an integral skirt portion which depends normally therefrom peripherally therearound.

5. The assembly of claim 1 wherein said securing means comprises a threaded aperture extending transversely through said adapter body, in spaced relation to said opening, and fastener means for fastening said adapter to said locking member.

6. The assembly of claim 1 wherein said securing means comprises a threaded shank secured at an inner end to said adapter body and extending normally therefrom.

7. A locking assembly for locking a multi-sided member in a particular communication orientation relative to an associated rigid body, comprising:
   a locking member including a planar body portion having a locking opening defined by a plurality of discrete sides which are disposed relative to each other for defining a closed, generally star-like conformation having predetermined dimensional characteristics, said locking opening being adapted for installation in close locking relation with side wall portions of an associated multi-sided member, said body portion further including an arcuate mounting slot spaced from said locking opening and adapted to receive fastening means therethrough, and an integral skirt portion depending transversely from the periphery of said body portion continuously therearound, said skirt having a distal edge remote from said body portion for spacing said body portion at a desired axial area along the associated multi-sided member; and,
   a locking member adapter including a body having a through opening adapted to surround a section of the associated multi-sided member and a securing means cooperable with said locking member mounting slot, said adapter including a mounting portion integral with said body and adapted for contacting a surface of an associated rigid body.

8. The assembly of claim 7 wherein said securing means includes a threaded shank secured adjacent one end to said adapter body and extending transversely therefrom, said shank extending through said locking member mounting slot and cooperatably receiving a nut on the outer end thereof for securing said locking member to said locking member adapter.

9. The assembly of claim 7 wherein said adapter mounting portion includes a pair of sections extending generally normal from said adapter body at opposed side edges thereof, said sections being configured so that they are adapted to extend over opposing sides of an associated rigid body.

10. The assembly of claim 7 wherein said adapter securing means comprises a threaded aperture extending transversely through said adapter body in spaced relation to said through opening, and wherein the assembly further comprises a threaded fastener, adapted for extending through said body portion mounting slot and for cooperating with said adapter threaded aperture, and a nut for securing said locking member to said locking member adapter.

11. The assembly of claim 10 wherein said adapter mounting portion includes a foot portion depending from said body adapted to contact an associated rigid body.

12. The assembly of claim 10 wherein said adapter mounting portion includes a pair of legs extending generally normal to said adapter body at opposed side edges thereof.

13. The assembly of claim 7 wherein said locking member body portion includes generally opposed side edges which taper toward each other from a maximum body portion width adjacent said locking opening to a minimum width adjacent said mounting slot.

14. The assembly of claim 7 wherein said locking member comprises a rigid metal stamping.

15. The assembly of claim 7 wherein said body portion locking opening has at least twice the number of discrete sides as does the multi-sided member with which it is adapted to be lockingly associated.

16. The assembly of claim 7 wherein said opening of generally star-like conformation has at least eight sides.

17. A locking assembly for locking a multi-sided member such as a valve bonnet, packing nut and the like against rotation relative to an associated valve body, comprising:
   a lock plate including, a body portion having a generally star-shaped locking opening adapted to be closely received around and lockingly engage the side walls of an associated multi-sided member, said body portion also having an arcuate mounting slot spaced from said locking opening and adapted to receive the shank of an associated fastener, and a side wall skirt integral with said body portion and extending peripherally therearound, said skirt being disposed generally normal to said body portion;

a lock plate adapter upon which said lock plate is positioned, said adapter including a body having a through opening adapted to surround a section of an associated multi-sided member, securing means aligned and cooperating with the mounting slot in said lock plate body and, a mounting portion integral with said body; and, a valve body on which said lock plate adapter is mounted such that said lock plate adapter mounting portion is in contact with a surface of said valve body.

18. The assembly of claim 17 wherein said lock plate has generally opposed sides which converge toward each other from a wider end toward a narrower end, said star-shaped opening being positioned adjacent said wider end and said arcuate mounting slot being positioned adjacent said narrower end.

19. The assembly of claim 17 wherein said lock plate adapter securing means includes a threaded shank secured at one end to said body and extending generally normal therefrom, said threaded shank extending through said lock plate mounting slot and cooperably receiving a nut on the outer end thereof for securing said lock plate to said lock plate adapter.

20. The assembly of claim 17 wherein said lock plate adapter securing means includes a threaded aperture extending transversely through said body for cooperably receiving the inner end of a threaded fastener therethrough, the outer end of said fastener protruding through said lock body mounting slot for receiving a nut to secure said lock plate to said lock plate adapter.

21. The assembly of claim 20 wherein said lock plate adapter mounting portion includes a foot portion depending from said body and wherein said valve body with which said assembly is to be operatively associated is provided with a reduced diameter aperture adapted to receive the inner end of said fastener, whereby only said foot portion and said fastener inner end will contact said valve body.

22. The assembly of claim 17 wherein the maximum width of said lock plate between opposing side edges of said body portion is no wider than the maximum width of said valve body with which the assembly is to be associated and wherein said side edges converge toward each other from a maximum body portion width adjacent said locking opening to a minimum width adjacent said mounting slot.

23. A locking assembly for locking a multi-sided member such as a valve bonnet, packing nut and the like against rotation relative to a rigid body such as a valve body, comprising:

a locking tab including a substantially trapezoidal body portion having opposed diverging side walls and opposed generally parallel end walls, a locking opening defined in one end of said body portion by a plurality of discrete sides which are disposed relative to each other for defining a generally semi-circular section of a star-shaped opening adapted to be placed in locking engagement with an associated multi-sided member, and an arcuate mounting slot extending through said body portion in a spaced relation to said locking opening; and, a locking tab adapter having a body including a transverse aperture therethrough adapted to be placed in surrounding relation with a section of an associated multi-sided member, and a securing means cooperating with said locking tab mounting slot wherein said locking tab adapter is generally saddle-shaped and includes a pair of wings extending normal to said adapter body and said securing means includes a threaded shank secured at an inner end thereof to said body to extend normally therefrom in a direction opposite to said wings, said threaded shank extending through said locking tab mounting slot and receiving a nut on the outer end thereof to secure said locking tab to said adapter.

24. A locking assembly for locking a multi-sided member such as a valve bonnet, packing nut and the like against rotation relative to a rigid body such as a valve body, comprising:

a locking tab including a substantially trapezoidal body portion having opposed diverging side walls and opposed generally parallel end walls, a locking opening defined in one end of said body portion by a plurality of discrete sides which are disposed relative to each other for defining a generally semi-circular section of a star-shaped opening adapted to be placed in locking engagement with an associated multi-sided member, and an arcuate mounting slot extending through said body portion in a spaced relation to said locking opening; and, a locking tab adapter having a body including a transverse aperture therethrough adapted to be placed in surrounding relation with a section of an associated multi-sided member, and a securing means cooperating with said locking tab mounting slot wherein said locking tab adapter is substantially planar and includes a foot portion depending from said body and with said body including a threaded aperture extending transversely therethrough in spaced relation to said transverse aperture, said threaded aperture receiving the inner end of a threaded fastener having a shank portion thereof extending through said locking tab mounting slot, and a nut received on the outer end of said fastener for securing said locking tab to said locking tab adapter.

25. A locking assembly for locking a multi-sided member such as a valve bonnet, packing nut and the like against rotation relative to a rigid body such as a valve body, comprising:

a locking tab including a substantially trapezoidal body portion having opposed diverging side walls and opposed generally parallel end walls, a locking opening defined in one end of said body portion by a plurality of discrete sides which are disposed relative to each other for defining a generally semi-circular section of a star-shaped opening adapted to be placed in locking engagement with an associated multi-sided member, and an arcuate mounting slot extending through said body portion in a spaced relation to said locking opening; and, a locking tab adapter having a body including a transverse aperture therethrough adapted to be placed in surrounding relation with a section of an associated multi-sided member, and a securing means cooperating with said locking tab mounting slot wherein said locking tab adapter includes a pair of legs extending normal to said adapter body from opposing side edges thereof and wherein said securing means includes a threaded aperture extending transversely through said body in spaced relation to said transverse aperture.

* * * * *